United States Patent [19]

Ueno et al.

[11] Patent Number: 5,033,872
[45] Date of Patent: Jul. 23, 1991

[54] BUSHING

[75] Inventors: Masato Ueno, Komaki; Katsuya Hadano; Mikio Itou, both of Kasugai, all of Japan

[73] Assignee: Toyoda Gosei Co., Ltd., Nishikasugai, Japan

[21] Appl. No.: 578,291

[22] Filed: Sep. 6, 1990

[30] Foreign Application Priority Data

Sep. 6, 1989 [JP] Japan .............................. 1-104700[U]
May 15, 1990 [JP] Japan .................................. 2-124542
May 21, 1990 [JP] Japan .................................. 2-130710
May 21, 1990 [JP] Japan .................................. 2-130711

[51] Int. Cl.$^5$ ......................................... F16C 23/04
[52] U.S. Cl. .................................... 384/146; 384/209
[58] Field of Search ............... 384/146, 145, 203, 204, 384/209, 210, 208

[56] References Cited

U.S. PATENT DOCUMENTS

| | | | |
|---|---|---|---|
| 4,034,996 | 7/1977 | Manita et al. | 384/203 |
| 4,483,569 | 11/1984 | Smith | 384/145 |
| 4,641,979 | 2/1987 | Stone | 384/146 |
| 4,718,779 | 1/1988 | Trudeau | 384/209 |

FOREIGN PATENT DOCUMENTS 61-49143 4/1986 Japan .
62-110616 7/1987 Japan .
62-110617 7/1987 Japan .
62-110619 7/1987 Japan .
62-110644 7/1987 Japan .
63-44572 11/1988 Japan .

Primary Examiner—Lenard A. Footland
Attorney, Agent, or Firm—Cushman, Darby & Cushman

[57] ABSTRACT

A bushing has a cylindrical retaining member and an inner cylinder having an expanded portion which radially outwardly expands at its axially central portion to define a spherical outer surface. A pair of ring-shaped inserts, each having a concave inner surface, are slidably disposed in contact with the spherical outer surface of the expanded portion. A pair of outer cylinders are press-fitted into the retaining member from open ends thereof. An inside end surface of each outer cylinder abuts on an outside surface of each insert, thereby pushing each insert toward the expanded portion of the inner cylinder. A pair of cylindrical sealing members are disposed between the outer cylinders and the inner cylinder for providing a seal therebetween. An inside edge of the outer surface of each sealing member is bonded to the inner surface of each outer cylinder, and an outside edge of the inner surface of each sealing member is in sealing engagement with the outer surface of the inner cylinder.

12 Claims, 11 Drawing Sheets

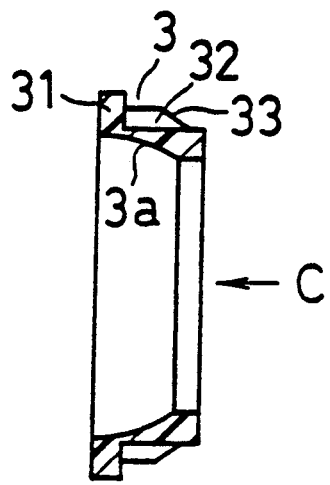
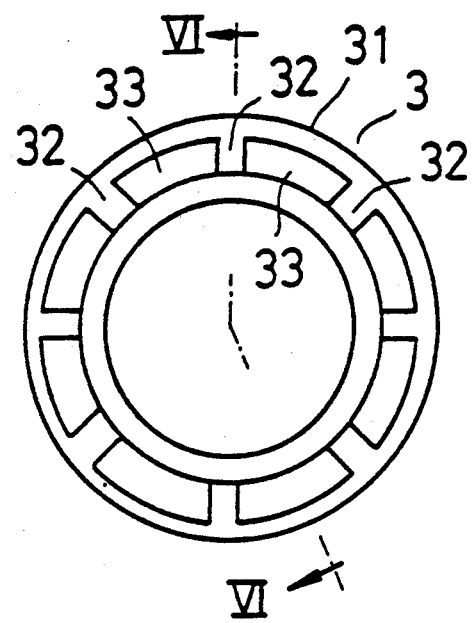
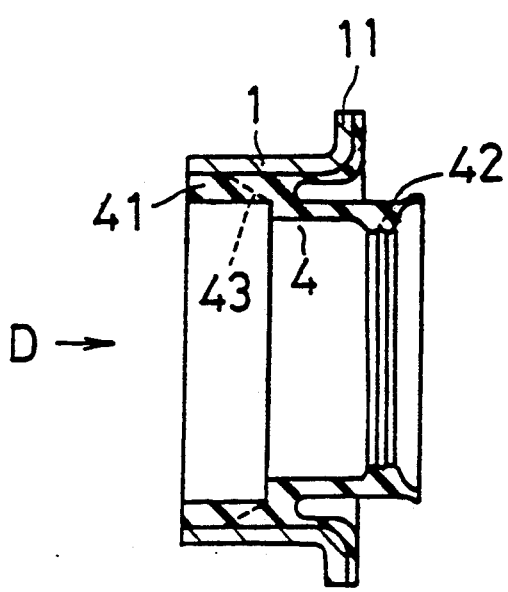
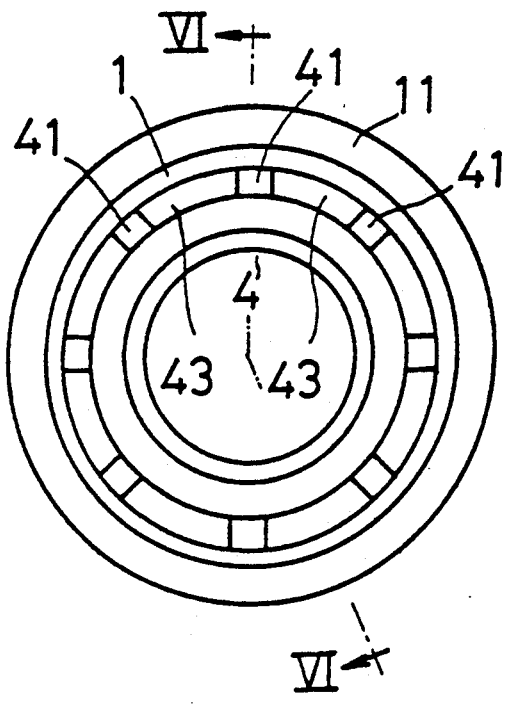

BUSHING

BACKGROUND OF THE INVENTION

1. Field of the Invention

The present invention relates to a bushing, and more particularly to a simply-structured bushing free from too large play between facing sliding surfaces thereof.

2. Description of the Prior Art

Cylindrical bushings have been used in coupling portions of a suspension of a vehicle. Recently, in order to realize an improved ride of the vehicle as well as the stability and controllability thereof, various types of bushings which have large rigidities in directions perpendicular to the axial direction thereof, and enable free rotation and twistable rocking of suspension arms, have been proposed. One of the above-described bushings is disclosed in Japanese examined Utility Model publication (Jikko) No. Sho 63-44572, and hereinafter will be briefly explained with reference to FIG. 24.

In the drawing, an outer cylinder 1 is press-fitted into a cylindrical retaining member 5 for a suspension arm. An inner cylinder 2 is coaxially disposed within the outer cylinder 1. The axially central portion of the inner cylinder 2 is radially expanded to form a spherical expanded portion 21. Inserts 3' made of resin are slidably in contact with the outer surface of the spherical expanded portion 21. The inserts 3' are inserted from both open ends of the outer cylinder 1. Seal rings 6, each having a lip portion 61, are disposed outside the inserts 3', and backup rings 7 are disposed outside the seal rings 6. These members are fixed in position by caulking the both open ends of the outer cylinder 1.

The conventional bushing having the above-described structure prevents the suspension arm from moving in directions perpendicular to the axial direction thereof, and enables it to rotate about the inner cylinder 2, and twistingly rock along the expanded portion 21 in the directions shown by the arrows in FIG. 24.

However, the above-described conventional bushing has a problem that when an external force is applied to the inserts 3' outwardly with respect to the axial direction thereof, the inserts 3' move outwardly and deform the seal rings 6, thereby decreasing the sealing property of the seal rings 6 and generating too large play between the inserts 3' and the expanded portion 21. Accordingly the stability and controllability of the vehicle are decreased.

The above-described conventional bushing has other problems of requiring troublesome works for preparing and assembling parts such as seal rings 6 and backup rings 7, and also requiring the caulking work of the outer cylinder 1, thereby increasing the production costs.

The problem that the number of parts is large is also encountered with other conventional bushings disclosed in Japanese unexamined Utility Model publications (Jikkai) Nos. Sho 61-49143 and Sho 62-110619.

SUMMARY OF THE INVENTION

It is an object of the present invention to provide a bushing capable of greatly decreasing the number of parts, and effectively preventing the generation of too large play between facing sliding surfaces, and the reduction in sealing property.

The bushing of the present invention has a cylindrical retaining member, an inner cylinder which is coaxially disposed within the retaining member, and is provided with an expanded portion radially outwardly expanding from the axially central portion thereof to define a spherical outer surface, a ring-shaped insert having a concave inner surface which is slidably in contact with the spherical outer surface of the expanded portion, a pair of outer cylinders, each being press-fitted into the retaining member from each open end of the retaining member, and having an abutting surface against the ring-shaped insert for pushing the insert toward the spherical outer surface of the expanded portion, a pair of cylindrical sealing members for providing a seal between the inner cylinder and the pair of outer cylinders, an inside edge of an outer surface of each of said cylindrical sealing members being bonded to the inner surface of each of the outer cylinders, an inner surface of each of said cylindrical sealing members extending along the outer surface of the inner cylinder, and an outside edge thereof being in sealing engagement with the outer surface of the inner cylinder.

In the bushing having the above-described structure, the abutting surfaces of the outer cylinders push the ring-shaped insert on the expanded portion of the inner cylinder, thereby securely preventing the outward movement of the ring-shaped insert with respect to the axial direction thereof. This results in the generation of too large play between the ring-shaped insert and the facing expanded portion, and the deformation of the sealing members being prevented, and accordingly, the reduction in sealing property being prevented.

The sealing members are integrally formed with the outer cylinders so that the number of parts can be decreased, and the sealing members are hardly deformed due to the application of an external force.

The bushing of the present invention does not require the caulking work of the outer cylinders in order to locate the insert and the sealing members in position, and accordingly, can realize the reduction in production costs.

BRIEF DESCRIPTION OF THE DRAWINGS

FIG. 7 is a longitudinal sectional view of the insert of the second embodiment;

FIG. 8 is a view taken in the direction of the arrow C of FIG. 7;

FIG. 9 is a longitudinal sectional view of the outer cylinder and the sealing member of the second embodiment;

FIG. 10 is a view taken in the direction of the arrow D of FIG. 9;

DESCRIPTION OF THE EMBODIMENTS

Figure 1:
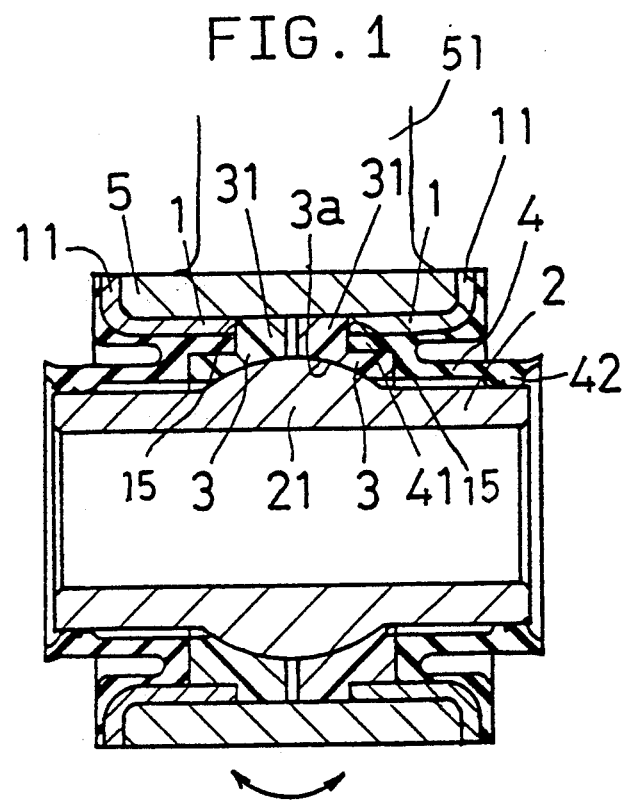
FIG. 1 is a longitudinal-sectional view of a first embodiment of a bushing in accordance with the present invention, in which inserts are taken along the line I—I of FIG. 3, and outer cylinders and sealing members are taken along the line I—I of FIG. 5.

FIGS. 1 through 5 illustrate a first embodiment of a bushing in accordance with the present invention. In FIG. 1, an inner cylinder 2 is coaxially inserted into a cylindrical retaining member 5 which is formed at an end of a suspension arm 51, and the axially central portion of the inner cylinder 2 is formed thick, thereby forming an expanded portion 21 having a radially outwardly expanded spherical surface. Ring-shaped inserts 3 are press-fitted into the space between the cylindrical retaining member 5 and the expanded portion 21 from both open ends of the cylindrical retaining member 5.

Figure 2:
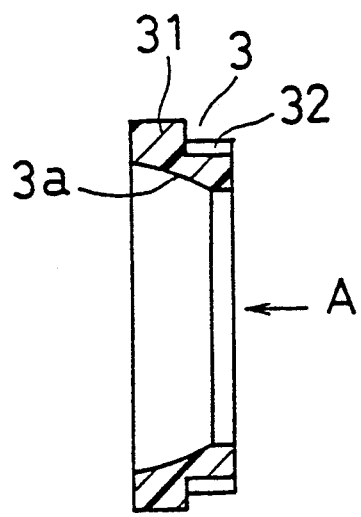
FIG. 2 is a longitudinal-sectional view of an insert of the first embodiment.

Each insert 3 is made of resin having excellent slidability, and has a concave inner surface 3a which is in conformity with the outer surface of the expanded portion 21 as shown in FIG. 2. The concave inner surface 3a is in contact with the outer surface of the expanded portion 21.

Figure 3:
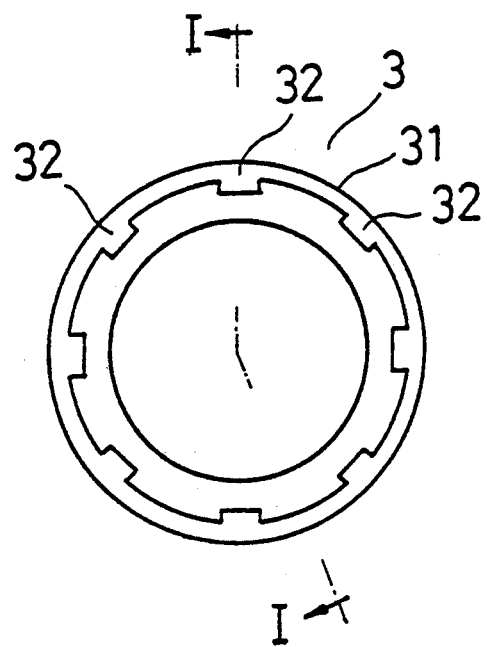
FIG. 3 is a view taken in the direction of the arrow A of FIG. 2.

Each insert 3 has a rib 31 of a large diameter in its inside half portion. The outer surface of the rib 31 of each insert 3 is in contact with the inner surface of the cylindrical retaining member 5. The outside half portion of each insert 3 is of a diameter slightly smaller than that of the rib 31, and a plurality of recesses 32, each having a rectangular cross-section, are formed in the outside half portion at equal distances in its circumferential direction as shown in FIG. 3.

Figure 4:
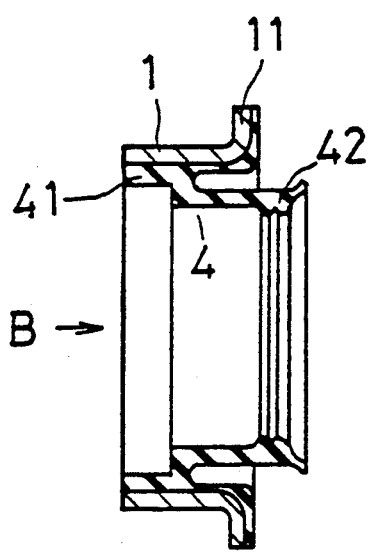
FIG. 4 is a longitudinal sectional view of an outer cylinder and a sealing member of the first embodiment.
Figure 5:
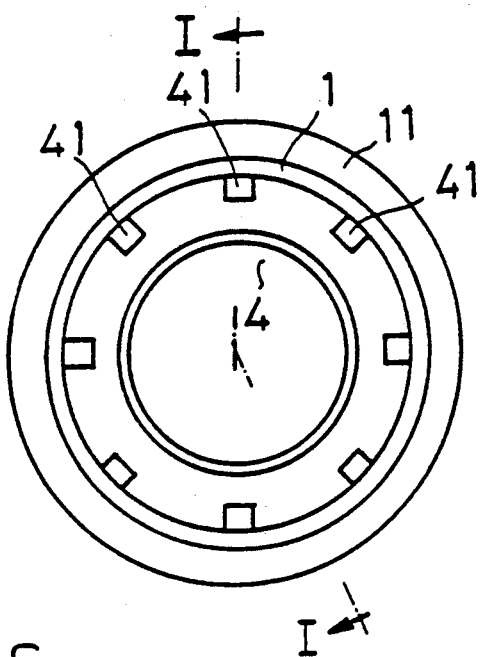
FIG. 5 is a view taken in the direction of the arrow B of FIG. 4.

Outer cylinders 1 are press-fitted into the cylindrical retaining member 5 from both open ends thereof. An outside end of each outer cylinder 1 is bent into an L-shaped cross-section, thereby forming a flange 1. Nearly cylindrical sealing members 4 are bonded to the inner surfaces of the respective outer cylinders 1. An inside edge of an outer surface of each of the sealing members 4 is bonded to the inner surface of each of the outer cylinders 1. As shown in FIG. 4, each sealing member 4 is provided with a plurality of inwardly oriented projections 41, each having a rectangular cross-section. These projections 41 are equally spaced from each other in the circumferential direction of each sealing member (FIG. 5). Seal lips 42 are formed on the inner surface of the outside open end of each sealing member 4.

When the outer cylinders 1 are press-fitted into the retaining member 5 wherein the inserts 3 are located in position, the outside half portion of each insert 3 enters the interior of each outer cylinder 1, and the inside end of each outer cylinder 1 abuts on the rib 31 of each insert 3, as shown in FIG. 1, and the projections 41 are press-fitted into the rectangular recesses 32 of each insert 3. Thus, the sealing members 4 which are bonded to the outer cylinders 1 cover the outside of the inserts 3. The sealing members 4 extend along the outer surface of the inner cylinder 2, and the seal lips 42 thereof come into sealing engagement with the outer surface of the inner cylinder 2.

In operation of the bushing of the first embodiment, the inserts 3 freely slides on and rotates about the expanded portion 21. This enables the suspension arm 51 to rotate about the inner cylinder 2, and twistingly rock as shown by the arrows in FIG. 1. The sealing members 4 retain grease between the facing sliding surfaces in good condition and prevents the intrusion of dust or the like into the interior of the bushing.

Furthermore, if a force is applied to the inserts 3 outwardly with respect to the axial directin thereof, the outward movement of the inserts 3 is certainly prevented because the inside end surface 15 of each outer cylinder 1 abuts on the rib 31 of each insert 3, serving as the abutting surface against each insert 3. Accordingly, there occurs neither too large play between the inserts 3 and the expanded portion 21, nor deformation of the sealing members 4.

In the first embodiment, if a rotating force about the inner cylinder 2 is applied to the inserts 3, the inserts 3 do not rotate thereabout because the rectangular recesses 32 of each insert 3 are engaged with the projections 41 of each sealing member 4. This results in the generation of too large play being prevented.

Figure 6:
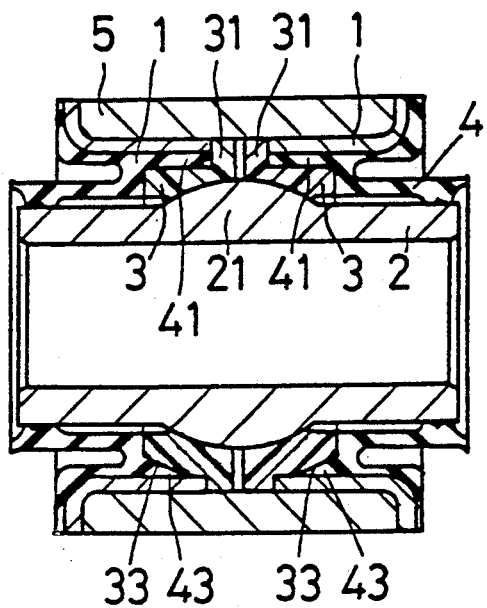
FIG. 6 is a longitudinal sectional view of a second embodiment of the bushing in accordance with the present invention, in which inserts are taken along the line VI—VI of FIG. 8 and outer cylinders and sealing members are taken along the line VI—VI of FIG. 10.

FIGS. 6 through 10 illustrate a second embodiment of the bushing in accordance with the present invention. FIG. 6 illustrates the assembled state of the bushing, FIGS. 7 and 8 illustrate the structure of the insert 3, and FIGS. 9 and 10 illustrate the structure of the respective outer cylinder 1 and sealing member 4. Each insert 3 has tapered surfaces 33 between adjacent rectangular recesses 32. Each sealing member 4 has tapered surfaces 43 conforming to the facing tapered surfaces 33 of each insert 3. In the assembled state of the bushing of the second embodiment, the tapered surfaces 33 of each insert 3 are in contact with the tapered surfaces 43 of each sealing member 4.

The second embodiment of the bushing having the above-described structure, can achieve a following operational effect in addition to the oprational effects of the first embodiment. Namely, the inserts 3 can deform in conformity to the outer surface of the expanded portion 21 because the tapered surfaces 43 of each sealing member 4 are compressible to some degree. Therefore, the second embodiment can realize a smooth rotation without generating any too large play.

Figure 11:
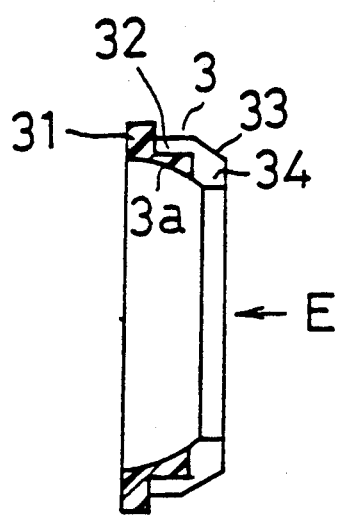
FIG. 11 is a longitudinal sectional view of an insert of a third embodiment of the bushing in accordance with the present invention.
Figure 12:
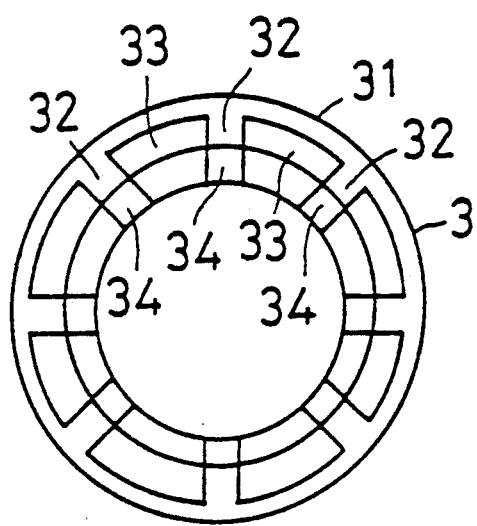
FIG. 12 is a view taken in the direction of the arrow E of FIG. 11.

FIGS. 11 and 12 illustrate the insert 3 to be assembled in a third embodiment of the bushing of the present invention.

In FIGS. 11 and 12, the outside end portion (right end portion of FIG. 11) of each rectangular recess 32 of the insert 3 is removed to form a notch 34. The remainder of the structure of the third embodiment is identical to that of the second embodiment.

This structure enables the inserts 3 to be easily deformed in conformity to the outer surface of the expanded portion 21, and accordingly enables the outer cylinders 1 to rotate about the inner cylinder 2 more smoothly as compared with the second embodiment.

FIGS. 13 through 16 illustrate a fourth embodiment of a bushing in accordance with the present invention.

Figure 14:
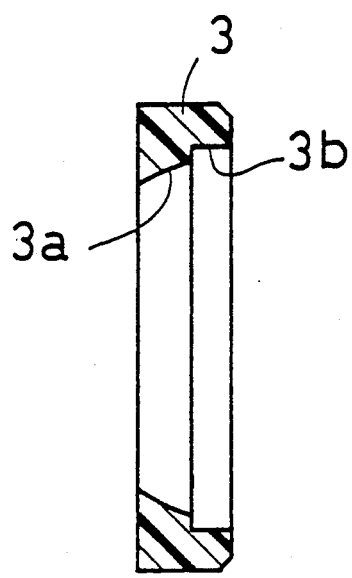
FIG. 14 is a longitudinal sectional view of an insert of the fourth embodiment.
Figure 15:
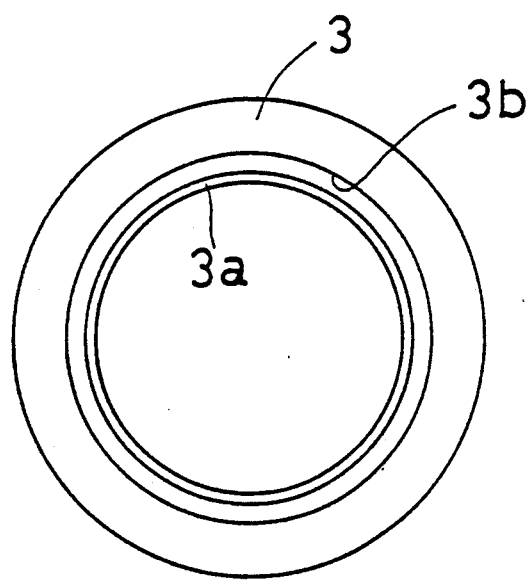
FIG. 15 is a front view of the insert of the fourth embodiment.

In the fourth embodiment, each of the inserts 3 has a circumferentially extending groove 3b having a rectangular cross-section in the entire inner surface of its inside half portion as shown in FIGS. 14, 15.

In the assembled state of the inserts 3, the concave surface 3a of each insert 3 is in contact with the outer surface of the expanded portion 21 while each rectangular groove 3b does not come into contact with the top surface of the expanded portion 21. This structure prevents the scattering in the sliding performance of the inserts 3 which is caused by the dimensional tolerance thereof.

Each of the sealing members 4 bonded to the inner surface of the outer cylinders 1 has a rubber elastic portion 44 of a uniform thickness, which projects from the inside end of each sealing member 4 towards the retaining member 5, and contacts with the inside end surface of each outer cylinder 1. A projecting sealing portion 12 having a semicircular cross-section is formed on the outer surface of the flange portion 11 of each outer cylinder 1.

The remainder of the structure of the fourth embodiment is substantially identical to that of the first embodiment.

When the outer cylinders 1 are press-fitted into the retaining member 5 wherein the inserts 3 are located in position, each elastic portion 44 comes into elastic contact with the outside surface of each insert 3 and pushes each insert 3 toward the expanded portion 21, and the sealing portion 12 formed on each flange portion 11 comes into close contact with each of edges of the retaining member 5. A sealing lip 42 formed on an outside end of each sealing member 4 comes into sealing engagement with the outer surface of the inner cylinder 2.

Figure 13:
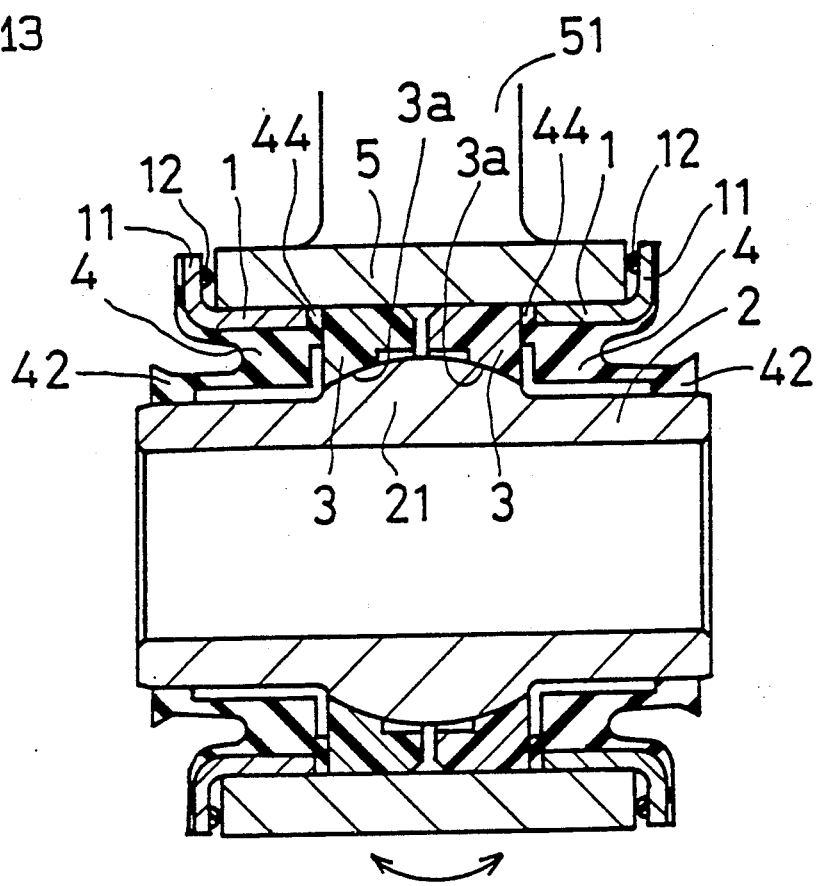
FIG. 13 is a longitudinal sectional view of a fourth embodiment of the bushing in accordance with the present invention.
Figure 16:
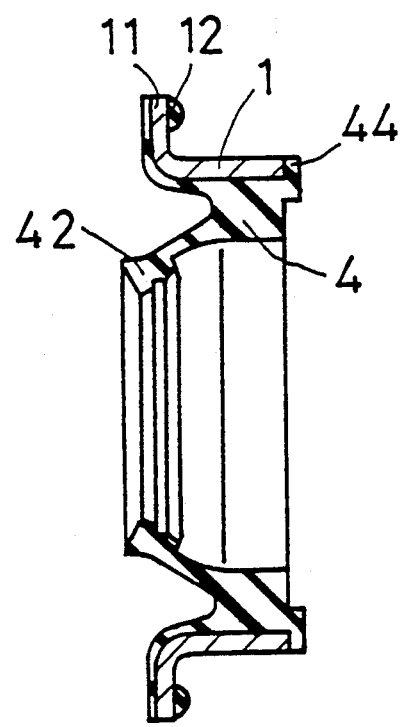
FIG. 16 is a longitudinal sectional view of an outer cylinder and a sealing member of the fourth embodiment.

The bushing of the fourth embodiment ensures a free twistable rocking of the suspension arm 51 in the directions shown by the arrows in FIG. 13 as well as a free rotation thereof about the inner cylinder 2. And the bushing of the fourth embodiment can retain grease between the facing sliding surfaces and prevent water or the like from intruding into the interior of the bushing.

Furthermore, the sealing portion 12 prevent the intrusion of water or the like into the spaces between facing surfaces of the retaining member 5 and the outer cylinders 1.

If a force is applied to the inserts 3 outwardly with respect to the axial direction thereof, this structure of the fourth embodiment securely prevents the outward movement of the inserts 3 because the inserts 3 are in abutting engagement with the inside end surfaces of the outer cylinders 1 through the elastic portions 44. Accordingly, the deformation of the sealing members 4 can be prevented.

Additionally, if the concave surface 3a is worn due to a long use of the bushing, the inserts 3 are always brought into sliding contact with the outer surface of the expanded portion 21 without generating too large play therebetween because the inserts 3 are pushed by the elastic portions 44 inwardly with respect to the axial direction.

The elastic portions 44 also serve to cancel some degree of scattering in press-fitted position of the outer cylinders 1.

Figure 17:
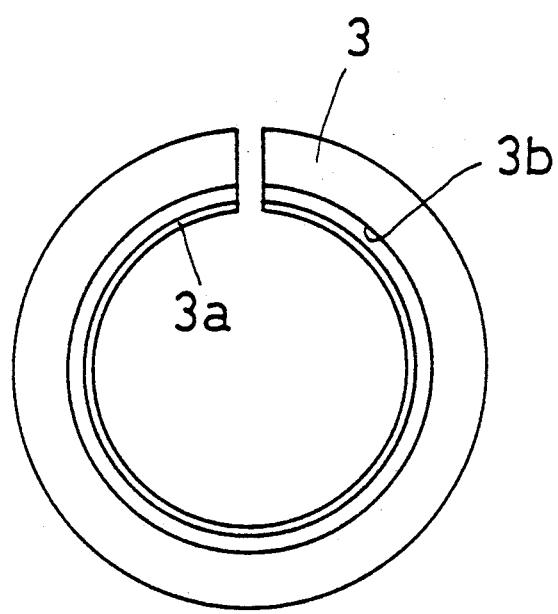
FIG. 17 is a front view of an insert of a fifth embodiment of the bushing in accordance with the present invention.

FIG. 17 illustrates an insert to be assembled in a fifth embodiment of the bushing of the present invention. In the drawings, the insert 3 is cut off in its one circumferential portion. The remainder of the structure of the fifth embodiment is identical to that of the fourth embodiment.

The insert 3 of the fifth embodiment having the above-described configuration can easily deform in conformity to the outer surface of the expanded portion 21 upon receiving the elastic force from the elastic portions 44, thereby realizing more excellent slidability of the insert 4 about the inner cylinder 1 as compared with the fourth embodiment.

Figure 18:
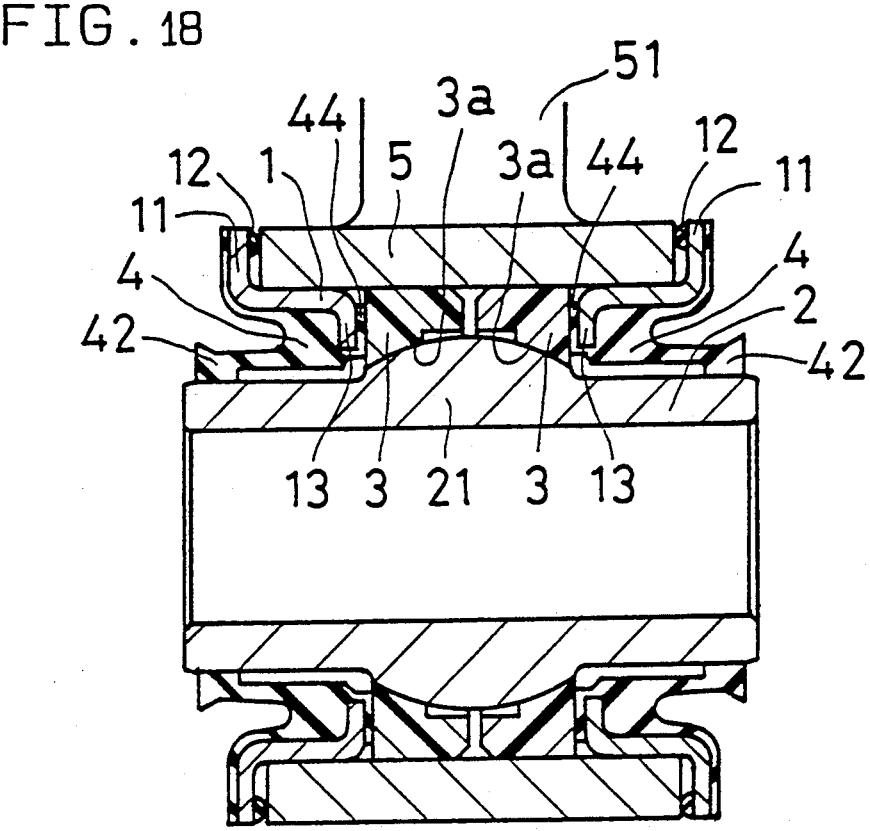
FIG. 18 is a longitudinal sectional view of a sixth embodiment of the bushing in accordance with the present invention.
Figure 19:
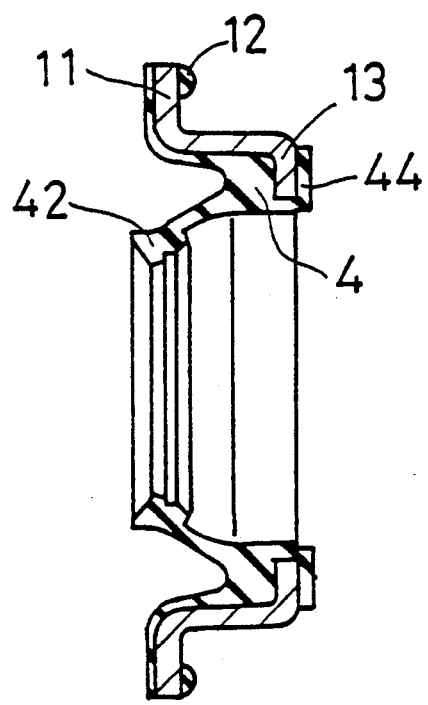
FIG. 19 is a longitudinal sectional view of an outer cylinder and a sealing member of the sixth embodiment.

FIGS. 18 and 19 illustrate a sixth embodiment of the bushing in accordance with the present invention.

In the sixth embodiment, the inside end surface of each outer cylinder 1 is bent radially inwardly to form a flange portion 13. A rubber elastic portion 44 having a predetermined uniform thickness covers the flange portion 13. The remainder of the structure of the sixth embodiment is identical to that of the fourth embodiment.

According to the sixth embodiment having the above-described structure, a bigger elastic force can be applied to the insert 3, as compared with the fourth embodiment.

Figure 20:
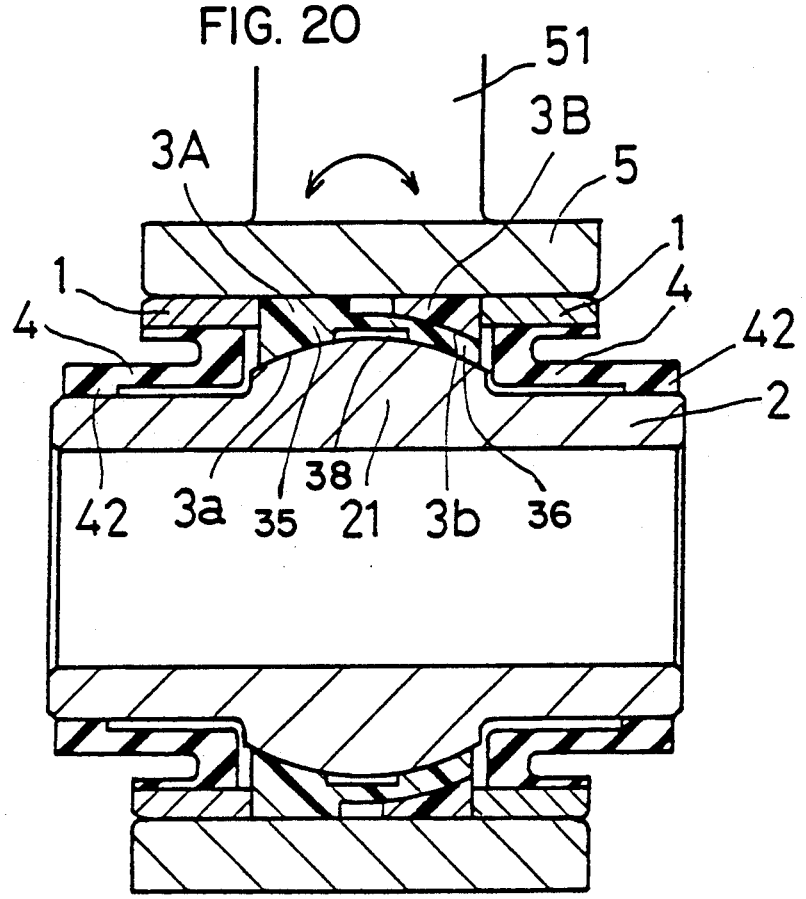
FIG. 20 is a longitudinal sectional view of a seventh embodiment of the bushing in accordance with the present invention.
Figure 21:
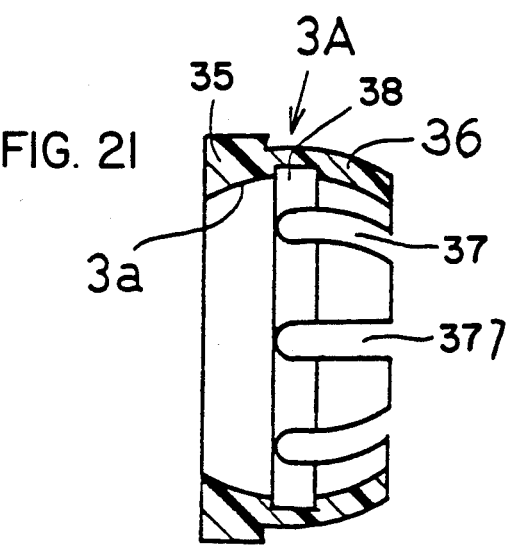
FIG. 21 is a longitudinal sectional view of an insert of the seventh embodiment.

FIGS. 20 and 21 illustrate a seventh embodiment of the bushing in accordance with the present invention. In the seventh embodiment, the ring-shaped inserts 3A and 3B are press-fitted between the retaining member 5 and the expanded portion 21 of the inner cylinder 2. The insert 3A covers the entire outer surface of the expanded portion 21 while the insert 3B is located around the insert 3A.

The insert 3A is made of a resin having good slidability, and the inner surface 3a of the insert 3A takes a spherical shape which conforms to the outer surface of the expanded portion 21. The insert 3A is composed of a thick-walled base portion 35 and a thin-walled portion 36 extending from the thick-walled base portion 31 as shown in FIG. 21. The base portion 35 has a nearly trapezoidal cross-section having a flat outer surface and a curved inner surface 3a.

The thin-walled portion 36 curves along the outer surface of the expanded portion 21. A plurality of slits 37 are axially formed at equal distances in its circumferential direction. The slits 37 enable the thin-walled portion 36 to contract or expand in its circumferential direction.

A circumferentially extending groove 38 is formed in the boundary of the base portion 35 of the thin-walled portion 36 so as to prevent this boundary from coming into contact with the top surface of the expanded portion 21, as shown in FIG. 20, and accordingly, prevent the sliding performance of the insert 3A from scattering due to the dimensional tolerance thereof.

The insert 3B is made of an elastic material such as hard urethane or hard rubber, and has a nearly trapezoidal cross-section. The outer surface thereof is flat and is in elastic contact with the inner surface of the retaining member 5 while the inner surface thereof takes a spherical concave shape and is in elastic contact with the outer surface of the thin-walled portion 36 of the insert 3A.

Outer cylinders 1 are press-fitted into the retaining member 5 from both open ends thereof, and the inside end surface of each outer cylinder 1 comes into contact with an outside surface of each of the inserts 3A, 3B to locate these inserts 3A, 3B in position.

Sealing members 4 are bonded to the inner surfaces of the outer cylinders 1. Each of the sealing members 4 has a nearly cylindrical shape. An inside end of an outer surface of each sealing member 4 is bonded to an inner surface of each of the outer cylinders 1. A sealing lip 42 is formed on the inner surface of an outside end of each sealing member 4 and is in sealing engagement with the outer surface of the inner cylinder 2.

In operation of the bushing of the seventh embodiment, the insert 3A freely slides on and rotates about the expanded portion 21. Accordingly, the suspension arm 51 freely rotates about the inner cylinder 2 and twistingly rocks in the directions shown by the arrows in FIG. 20. Furthermore, the sealing members 4 retain grease between the facing sliding surfaces of the bushing, and prevent the intrusion of water or the like into the interior of the bushing.

If a force is applied to the inserts 3A, 3B outwardly with respect to the axial direction thereof, the inserts 3A, 3B are securely prevented from outwardly moving because they abut on the inside end surfaces of the outer cylinders 1, respectively. This structure of the seventh embodiment is free from the generation of too large play between the inserts 3A, 3B and the expanded portion 21. Accordingly, the deformation of the sealing members 4 can be prevented.

If the concave surface 3a is worn due to a long use of this bushing, the concave surface 3a is always brought into sliding contact with the outer surface of the expanded portion 21 without generation of any too large play because the thin-walled portion 36 of the insert 3A always receives an elastic force from the insert 3B so that the insert 3A is always pushed on the outer surface of the expanded portion 21 of the inner cylinder 2.

Figure 22:
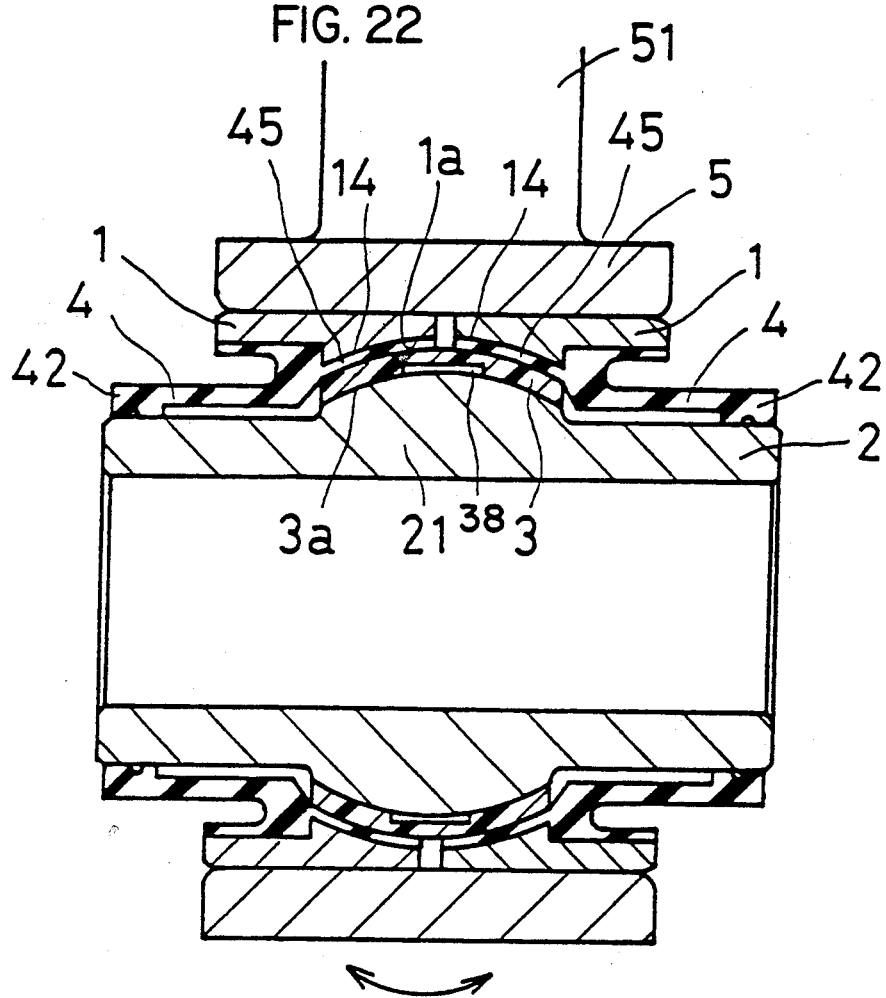
FIG. 22 is a longitudinal sectional view of an eighth embodiment of the bushing in accordance with the present invention.
Figure 23:
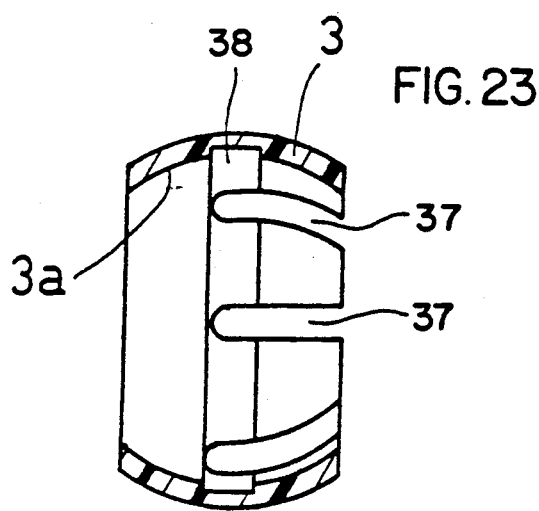
FIG. 23 is a longitudinal sectional view of an insert of the eighth embodiment.
Figure 24:
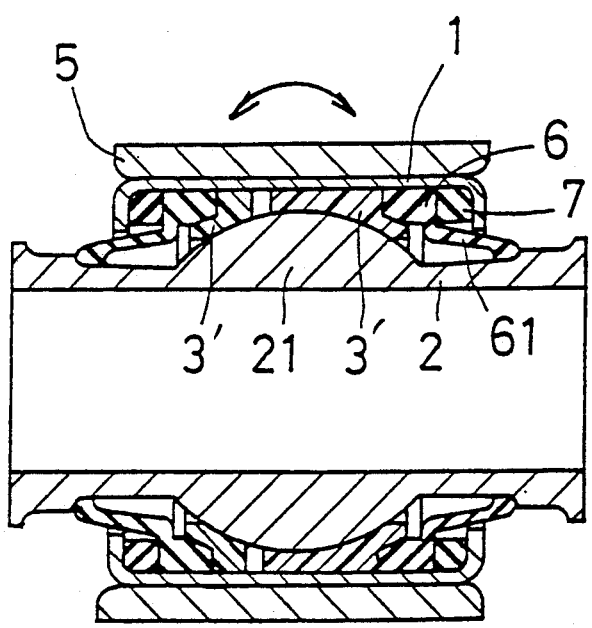
FIG. 24 is a longitudinal sectional view of a conventional bushing.

FIGS. 22 and 23 illustrate an eighth embodiment of the bushing in accordance with the present invention. In the eighth embodiment, a thin-walled ring-shaped insert 3 having an arc-shaped cross section covers the outer surface of the expanded portion 21.

A groove 38 is formed along the axially central portion of the inner surface 3a of the insert 3 as shown in FIG. 23. A plurality of slits 37 are axially formed from one open end of the insert 3 to the groove 38 at equal distances in its circumferential direction.

The slits 37 enable the insert 3 to contract or expand in conformity to the outer surface of the expanded portion 21.

The groove 38 is not in contact with the top surface of the expanded portion 21, as shown in FIG. 22, thereby preventing the scattering in sliding movement of the insert 3 due to the dimensional tolerance thereof.

Each of outer cylinders 1 which are press-fitted into the retaining member 5 has a large thickness. The inside half portions of the outer cylinders 1 have arc-shaped inner surfaces 14 to define a spherical concave surface 1a which is nearly parallel with the outer surface of the expanded portion 21. These arc-shaped inner surfaces 14 serve as the abutting surfaces against the insert 3.

A sealing member 4 which is bonded to the inner surface of the outside half portion of each outer cylinder 1 has a nearly cylidrical shape. An inside end of an outer surface of each sealing member 4 is bonded to the inner surface of each outer cylinder 1. Sealing lips 42 are formed on the inner surface of the outside open end of each rubber sealing member 4 and are in sealing engagement with the outer surface of the inner cylinder 2.

Each sealing member 4 has an elastic portion 45 having a uniform small thickness, which covers the inner surface of the inside half portion of each outer cylinder 1. Each elastic portion 45 is in elastic contact with the outer surface of the insert 3, thereby pushing the insert 3 into contact with the outer surface of the expanded portion 21.

In operation, the insert 3 freely slides on and rotates about the expanded portion 21 so that the suspension arm 51 can rotate about the inner cylinder 21, and twistingly rock in the directions shown by the arrows in FIG. 22. In addition, the sealing members 4 can retain grease in good condition, and prevent water or the like from intruding into the interior of the bushing.

In accordance with the eighth embodiment, if a force is applied to the insert 3 outwardly with respect to the axial direction thereof, the insert 3 is prevented from moving outwardly because the insert 3 is pushed on the spherical outer surface of the expanded portion 21 by the elastic portion 45. Accordingly, the bushing of the eighth embodiment is free from the deformation of the sealing members 4.

Moreover, if the concave surface 3a is worn due to a long use of the bushing, the concave surface 3a of the insert 3 is always brought into sliding contact with the outer surface of the expanded portion 21 without generating too large play therebetween because the insert 3 is always pushed radially inwardly by the rubber elastic portion 45.

In the preceding embodiments, the elastic portion 44 or 45 is integrally formed with each sealing member 4. In accordance with the present invention, an elastic member having a uniform thickness, which is independent of each sealing member 4, may be provided in place of the elastic portion 44 or 45.

What is claimed is:
1. A bushing comprising:
a cylindrical retaining member having longitudinally facing two open ends;
an inner cylinder coaxially disposed within said cylindrical retaining member, and having an expanded portion at an axially central portion thereof; said expanded portion expanding radially outwardly to define a spherical outer surface;
a ring-shaped insert having a concave inner surface which is slidably in contact with said spherical outer surface of said expanded portion;
a pair of outer cylinders, each having an abutting surface against said ring-shaped insert, and each being press-fitted into said retaining member from each of longitudinally facing two open ends thereof, said pair of outer cylinders pushing said ring-shaped insert toward said expanded portion in said abutting surface; and a pair of cylindrical sealing members for providing a seal between said inner cylinder and said pair of outer cylinders, an inside edge of an outer surface of each of said pair of cylindrical sealing member being bonded to an inner surface of each of said pair of outer cylinders, an inner surface of each of said pair of cylindrical sealing members extending along an outer surface of said inner cylinder, and an outside edge thereof being in sealing engagement with said outer surface of said inner cylinder.

2. The bushing according to claim 1, wherein said ring-shaped insert is made of an elastically deformable material and has a thin-walled cylindrical shape, and an inside half portion of each of said pair of outer cylinders has a curved inner surface conforming to the outer surface of said expanded portion, said curved inner surface serves as said abutting surface against said ring-shaped insert.

3. The bushing according to claim 2, wherein said ring-shaped insert has a circumferentially extending groove at an axially central portion of said inner surface thereof, and a plurality of slits axially extending from one open end to said groove at distances in the circumferential direction of said ring-shaped insert.

4. The bushing according to claim 2, further comprising an elastic member having a uniform thickness, which is disposed between said abutting surface of each of said pair of outer cylinders and an outer surface of said ring-shaped insert.

5. The bushing according to claim 1, wherein said ring-shaped insert is composed of a pair of inserts, each having an inner concave surface, an outer surface of each of said pair of inserts is in contact with an inner surface of said cylindrical retaining member, said inner concave surface of each of said pair of inserts is slidably in contact with an outer surface of said expanded portion, and an inside end surface of each of said pair of outer cylinders is in contact with an outside surface of each of said pair of inserts, serving as said abutting surface against said ring-shaped insert.

6. The bushing according to claim 5, wherein an external diameter of an outside half portion of each of said pair of inserts is less than the internal diameter of each of said pair of outer cylinders, an outer surface of said outside half portion of each of said pair of inserts has recesses, and each of said sealing members has projections to be fitted in said recesses of said outside half portion of each of said pair of inserts.

7. The bushing according to claim 6, wherein said outside half portion of each of said pair of inserts has tapered outer surfaces between said recesses, and each of said sealing members has tapered inner surfaces which abut on said tapered outer surfaces of each of said pair of inserts.

8. The bushing according to claim 5, further comprising an elastic member having a uniform thickness, which is disposed between the inside end surface of each of said outer cylinders and the outside surface of each of said pair of inserts.

9. The bushing according to claim 5, wherein each of said pair of inserts has a circumferentially extending groove having a rectangular cross section at an inside end of the inner surface thereof.

10. The bushing according to claim 1, wherein said ring-shaped insert is composed of a pair of inserts, one of said pair of inserts has a thick-walled base portion of which an outer surface is in contact with an inner surface of said cylindrical retaining member and of which an inner surface is slidably in contact with an outer surface of said expanded portion, and an elastically deformable thin-walled portion which extends from said base portion with its inner surface in sliding contact with an outer surface of said expanded portion, the other insert of said pair of inserts is made of an elastic material, an outer surface of said the other insert is in elastic contact with the inner surface of said cylindrical retaining member, and an inner surface of said the other insert is in elastic contact with an outer surface of said thin-walled portion.

11. The bushing according to claim 10, wherein said one insert has a circumferentially extending groove at a boundary between said base portion and said thin-walled portion of the inner surface thereof, and a plurality of slits axially extending from one open end to said groove at distances in the circumferential direction of said one insert.

12. The bushing according to claim 1, wherein each of said pair of outer cylinders has a radially outwardly bending flange portion at an outside end thereof, a sealing portion is formed on an outer surface of said flange portion, which is opposed to each of said open ends of said cylindrical retaining member, said sealing portion is in sealing engagement with each of said open ends of said cylindrical retaining member.

* * * * *